(12) United States Patent
Liao et al.

(10) Patent No.: US 9,587,784 B2
(45) Date of Patent: Mar. 7, 2017

(54) OIL INJECTOR FOR A VEHICLE

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

( * ) Notice: Subject to any disclaimer, the term of this patent is extended or adjusted under 35 U.S.C. 154(b) by 0 days.

(21) Appl. No.: 14/884,252

(22) Filed: Oct. 15, 2015

(65) Prior Publication Data

US 2016/0033078 A1 Feb. 4, 2016

Related U.S. Application Data

(63) Continuation-in-part of application No. 13/890,277, filed on May 9, 2013, now abandoned.

(51) Int. Cl.
| | | |
|---|---|---|
| *F16N 3/08* | (2006.01) |
| *B65D 47/24* | (2006.01) |
| *F16N 3/04* | (2006.01) |
| *F16N 13/08* | (2006.01) |

(52) U.S. Cl.
CPC ............. *F16N 3/08* (2013.01); *B65D 47/242* (2013.01); *F16N 3/04* (2013.01); *F16N 13/08* (2013.01)

(58) Field of Classification Search
CPC ... F16N 3/04; F16N 3/08; F16N 13/08; B65D 47/242
See application file for complete search history.

(56) References Cited

U.S. PATENT DOCUMENTS

| | | | |
|---|---|---|---|
| 51,112 A | 11/1865 | Foster | |
| 182,675 A | 9/1876 | Johnson | |
| 1,286,830 A | 12/1918 | Sturmer | |
| 1,580,618 A | 4/1926 | Lovequist et al. | |
| 1,729,203 A | 9/1929 | Bowman | |
| 1,815,221 A | 7/1931 | Sweetland | |
| 1,858,419 A | 5/1932 | Sether | |
| 3,321,110 A | 5/1967 | Price | |
| 3,752,367 A | 8/1973 | Sundholm | |
| 4,077,493 A | 3/1978 | Spaude et al. | |
| 4,311,258 A | 1/1982 | Bradshaw | |
| 4,690,304 A * | 9/1987 | Morel .................... | B65D 47/24 222/153.14 |
| 5,713,493 A | 2/1998 | Garibaldi | |
| 5,810,185 A | 9/1998 | Groesbeck | |
| 6,244,476 B1 | 6/2001 | Moretti | |
| 6,286,733 B1 | 9/2001 | Francois | |
| 6,474,515 B1 * | 11/2002 | Ladina ................. | B65D 47/242 222/481.5 |
| 7,661,560 B2 | 2/2010 | Murray | |
| 2006/0060426 A1 | 3/2006 | Chen | |

(Continued)

*Primary Examiner* — Minh Truong
(74) *Attorney, Agent, or Firm* — Muncy, Geissler, Olds & Lowe, P.C.

(57) ABSTRACT

An oil injector for a vehicle is provided. The oil injector includes a transparent body having a flowing hole formed on a front end of the body. A flexible tube member is connected to the body and corresponds to the flowing hole. A storing space is formed in an internal portion of the body. One end of a piston member is entered into the storing space, and the piston member is movable relative to the body. Therefore, the piston member provides a pushing function in the storing space so that a fluid flows into or out form the body via the tube member, and the transparent body is provided for observing a storing amount of the fluid in the body.

14 Claims, 5 Drawing Sheets

(56) References Cited

U.S. PATENT DOCUMENTS

2009/0173845 A1 7/2009 Wang et al.
2010/0084436 A1 4/2010 Arvizu
2012/0220948 A1 8/2012 Barbour

* cited by examiner

US 9,587,784 B2

OIL INJECTOR FOR A VEHICLE

FIELD OF THE INVENTION

The present invention is a CIP of application Ser. No. 13/890,277, filed May 9, 2013, the entire contents of which are hereby incorporated by reference.

BACKGROUND OF THE INVENTION

Description of the Prior Art

In a conventional oil supplying way for a vehicle, generally, a user opens an opening of an oil tank of the vehicle and handholds an oil can (such as a gasoline or a brake oil) to pour an oil into the opening of the oil tank for supplying a proper oil amount. However, the conventional oil supplying way would have the oil be carelessly dripped out from the oil tank; thereby the oil is wasted and an environment is polluted. Thus, a conventional oil supplying apparatus is provided for overcoming said waste and pollution.

The conventional oil supplying apparatus comprises a tube body and a piston. The tube body is made of a metallic material and is provided for receiving oil. The piston is movable in the tube body for pressing the oil in the body, so that a user could operate the piston to supply the oil into an oil tank via the tube body.

However, the tube body of the conventional oil supplying apparatus is non-transparent, such that the user cannot know a storing amount of the oil in the tube body. Therefore, the user would supply insufficient oil into the oil tank, or the oil would easily remain in the tube body.

Another conventional oil supplying apparatus comprises an oil storing body and a controlling member. The oil storing body is placed into an oil tank, and the controlling member is located at an external position of the oil tank, so that a user could operate the controlling member to supply the oil into the oil tank.

However, the user cannot observe a residual amount of the oil in the oil storing body. When the user releases the oil storing body from the oil tank, the residual oil would be easily dripped out from the oil storing body; thereby the residual oil is wasted and an environment is polluted. Therefore, the conventional oil supplying apparatus needs to be improved.

U.S. Pat. No. 1,729,203 and U.S. Pat. No. 1,815,221 each disclose that a cap is screwed to an opening portion of a barrel for discharging fluid. The cap and the barrel are not integrally formed, and the opening portion is not integrally formed a tapered tube portion for connection of a flexible tube. The cap has no axially-movable mechanism for controlling outflow of the fluid from the barrel.

US2010/0084436 is directed to a spigot for a collapsible beverage container. It is noted that the spigot is re-sealable by pushing of the inside-out outflow of fluid. That is, the spigot should not be connected to a tapered front end portion of an injector barrel since the spigot is configured to normally prevent leakage of fluid.

The present invention is, therefore, arisen to obviate or at least mitigate the above mentioned disadvantages.

SUMMARY OF THE INVENTION

An object of the present invention is to provide an oil injector for a vehicle, in which the oil injector could provide a function for observing a fluid storing amount and be conveniently operated.

To achieve the above and other objects, an oil injector for a vehicle is provided. The oil injector includes a transparent body having a flowing hole formed on a front end of the body. A flexible tube member is connected to the body and corresponds to the flowing hole. A storing space is formed in an internal portion of the body. One end of a piston member is entered into the storing space, and the piston member is movable relative to the body. An indicator is disposed on the body. A metallic positioning member is assembled on one end of the tube member.

Therefore, the piston member provides a pushing function in the storing space so that a fluid flows into or out from the body via the tube member. The positioning member could be firmly inserted onto an opening of an oil tank. The transparent body is provided for observing a storing amount of the fluid in the body.

Besides, a valve member and a controlling member are disposed at the flowing hole of the body. The valve member is correspondingly assembled to the flowing hole. The controlling member is movable between a first position and a second position relative to the valve member for controlling a flowing amount between the valve member and the tube member.

A rib portion and a through hole are disposed on a front end of the valve member.

When the controlling member is located at the first position, the rib portion does not abut against an internal wall of the controlling member, so that the flowing hole communicates with the through hole and the tube member. When the controlling member is located at the second position, the rib portion abuts against the internal wall of the controlling member, so that the through hole does not communicate with the tube member. Thereby a user could adjust an inflow amount or an outflow amount of the body via the controlling member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
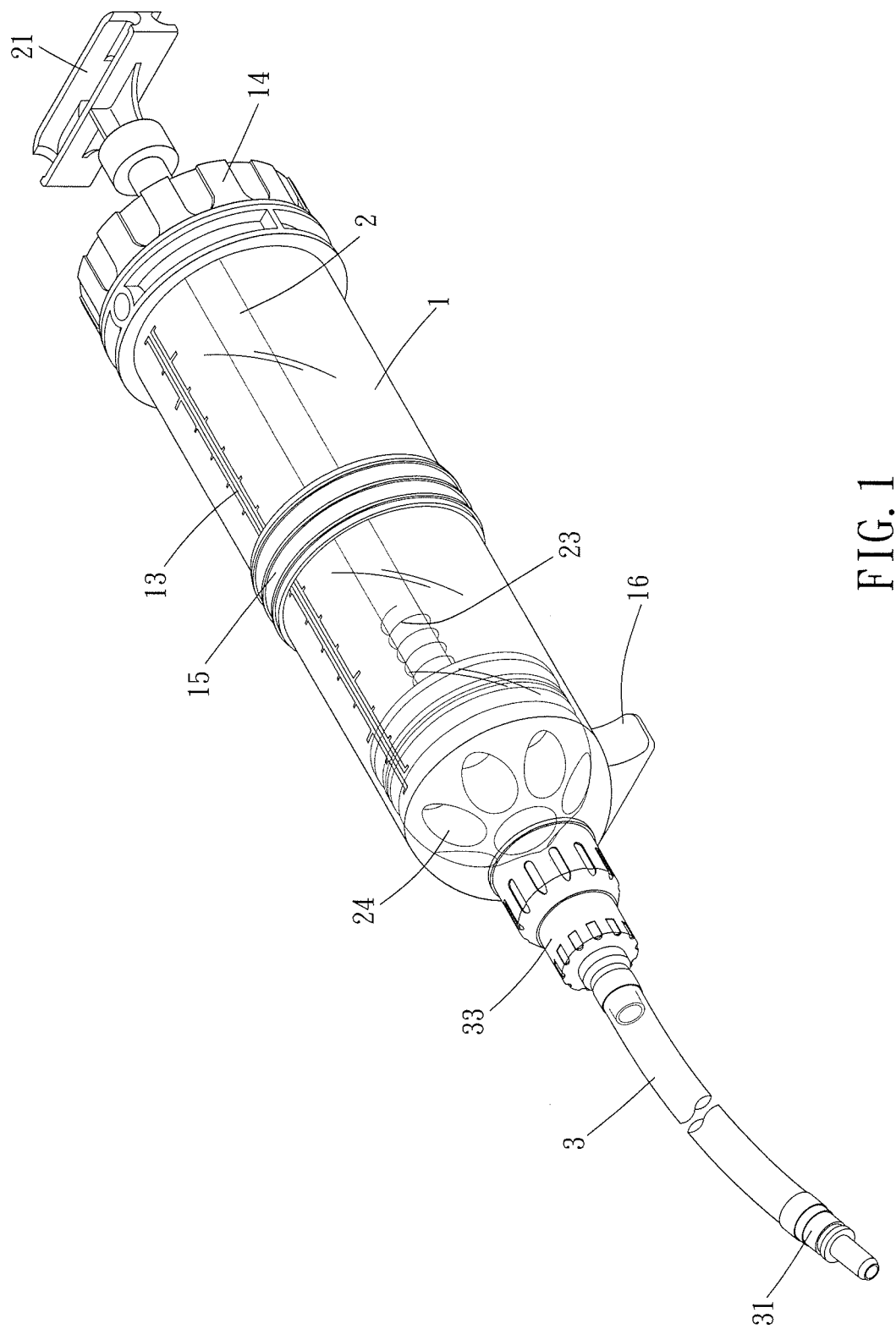
FIG. 1 is a perspective view of an oil injector for a vehicle according to a preferred embodiment of the present invention.
Figure 2:
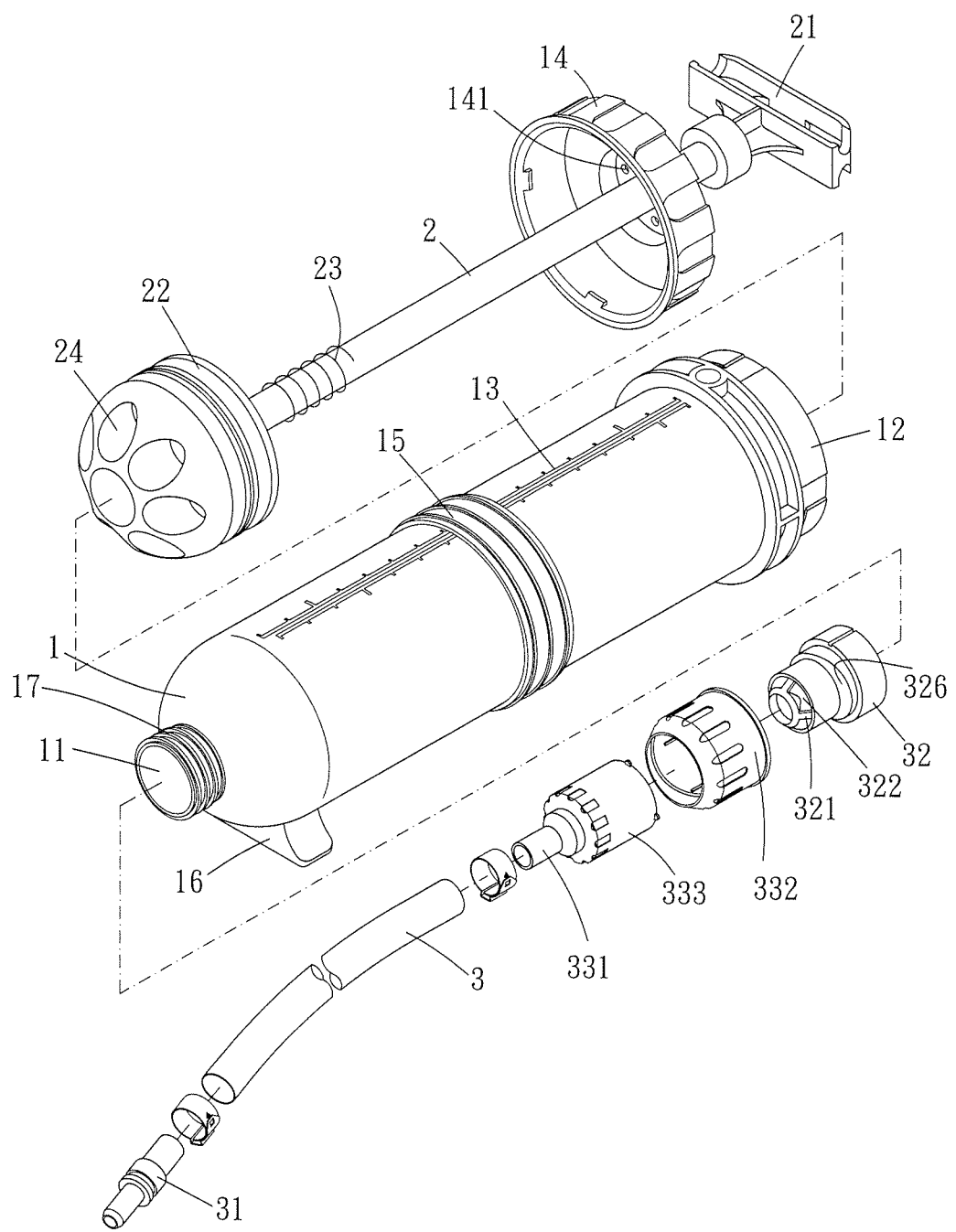
FIG. 2 is an exploded perspective view of the present invention.

FIGS. 1-2 show an oil injector for a vehicle according to a preferred embodiment of the present invention. The oil injector includes a body 1 which is transparent, a piston member 2 and a flexible tube member 3.

The body 1 is a transparent tube and has a storing space formed in an internal portion thereof. A flowing hole 11 is formed at one end of the body 1 and communicates with the storing space. An opening 12 is formed at another end of the body 1, and a fluid can be allowed to flow into the storing space via the opening 12. The body 1 has an indicator 13 axially disposed along a longitudinal portion thereof.

A cover 14 is assembled to the body 1 for sealing the opening 12. One end of the piston member 2 is entered into the storing space of the body 1, and another end of the piston member 2 passes through the cover 14 and has a handle 21 assembled thereon. An external circumference of one end of the piston member 2 is sleeved by two pressing members 22 (the pressing member 22 might be an O-ring) which are spaced from each other. The pressing member 22 could tightly abut against an internal wall of the storing space. An external side of the pressing member 22 is formed as cone-shaped, so that the external side of the pressing member 22 could flexibly abut against the internal wall of the storing space, so as to reduce a friction between the pressing member 22 and the internal wall of the storing space and increase a sealing efficiency.

One end of the piston member 2 is formed as a hemisphere so as to have the piston member 2 smoothly abut against the internal wall of the storing space; thereby the piston member 2 could be smoothly moved relative to the body 1.

The piston member 2 is sleeved by an elastic member 23 so as to provide a recovery function for the piston member 2. Besides, at least one air hole 141 is opened on the cover 14 for adjusting an air pressure in the storing space, so that the piston member 2 is movable relative to the body 1. At least one groove 24 is formed at a front end of the piston member 2 for reducing a weight and a producing material of the piston member 2.

An external circumference of the body 1 is sleeved by an anti-skid member 15 for a user to conveniently hold the body 1. A frame 16 is assembled on the external circumference of the body 1 for firmly supporting the body 1.

One end of the tube member 3 is correspondingly connected to the flowing hole 11 of the body 1, and another end of the tube member 3 has a metallic positioning member 31 assembled thereon. The positioning member 31 could be firmly connected to an opening of an oil tank, so that the fluid can flow into or flow out from the body 1 via the tube member 3.

Figure 5:
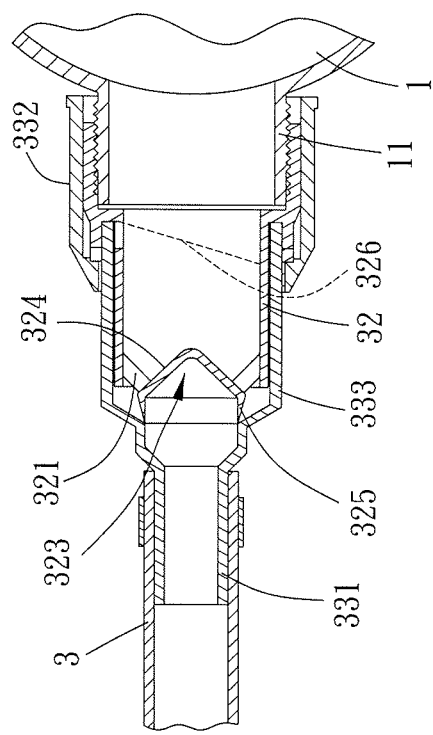
FIGS. 5-6 are cross-sectional views of the present invention for showing a controlling member is rotatable relative to a valve member for the oil to flow from the body into a tube member.
Figure 6:
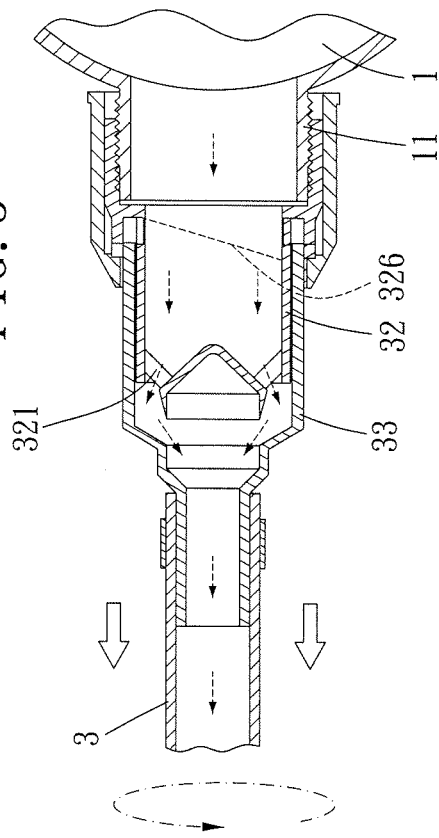

Referring to FIGS. 1 and 5-6, the present invention comprises a valve member 32 and a controlling member 33. The valve member 32 is correspondingly assembled to the flowing hole 11. The controlling member 33 is movable between a first position and a second position relative to the valve member 32 for controlling a flowing amount between the valve member 32 and the tube member 3.

In the embodiment, the controlling member 33 is rotatably assembled relative to the valve member 32. The valve member 32 is screwed to the body 1 and communicates with the flowing hole 11.

A rib portion 321 and a through hole 322 are disposed at a front end of the valve member 32.

When the controlling member 33 is rotated to the first position, the rib portion 321 does not abut against an internal wall of the controlling member 33, so that the flowing hole 11 communicates with the through hole 322 and the tube member 3 (as shown in FIG. 6). When the controlling member 33 is rotated to the second position, the rib portion 321 abuts against the internal wall of the controlling member 33, so that the through hole 322 does not communicate with the tube member 3 (as shown in FIG. 5).

Specifically, the front end of the body 1 is integrally protrudingly tapered and formed with a threaded portion 17 around the flowing hole 11, the valve member 32 is threaded to the threaded portion 17, and the controlling member 33 is disposed around the valve member 32. The controlling member 33 integrally projects and tapers outwardly to form a necked tube portion 331 for the flexible tube member 3 to be sleeved thereon. The controlling member 33 includes an outer tubular member 332 disposed around the valve member 32 and an inner tubular member 333 sleeved within and projecting out of the outer tubular member 332, and the inner tubular member 333 is formed with the necked tube portion 331. The inner tubular member 333 is disposed around the valve member 32 and axially movable relative to the valve member 32. The valve member 32 includes a circumferential slop 326. Through axial movement of the inner tubular member 333 relative to the valve member 32, the circumferential slop 326 can move entirely into the inner tubular member 333 or move away from the inner tubular member 333. The circumferential slop 326 reduces frictional drag and vacuum suction between the inner tubular member 333 and the valve member 32. The valve member 32 includes a conical shell member 323 open toward a direction opposite the threaded portion 17 and a conical surface 324 facing the threaded portion 17 and tapered toward the threaded portion 17, and the conical shell member 323 selectively sealingly abuts against an internal wall of the controlling member 33. The conical shell member 323 includes a ring skirt section 325 extending and tapered in the direction opposite the flowing hole 11, and the ring skirt section 325 selectively sealingly abuts against the internal wall of the controlling member 33.

Figure 3:
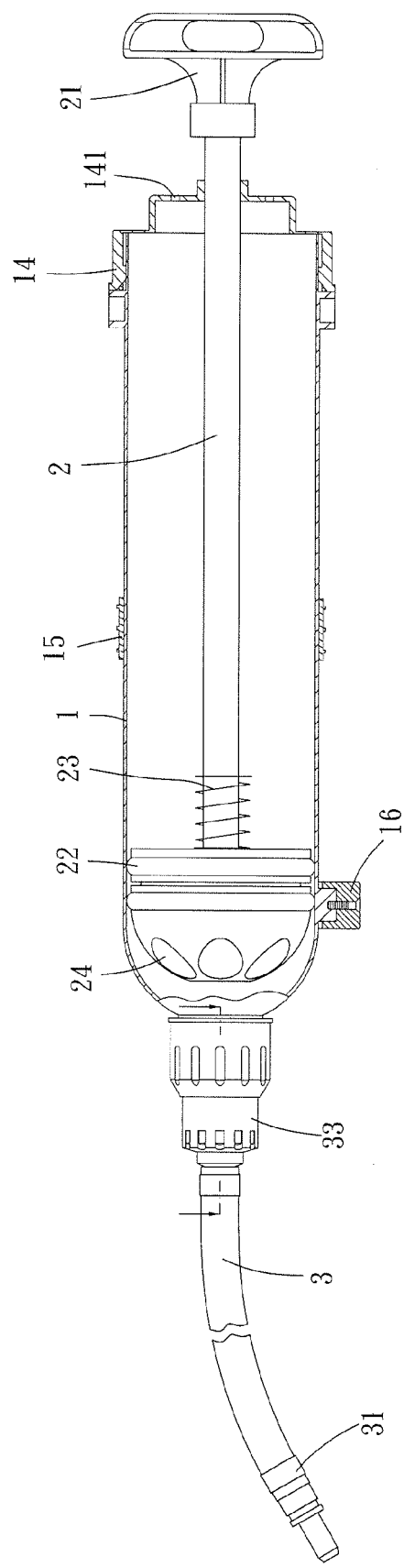
FIGS. 3-4 are cross-sectional views of the present invention for showing a piston member is movable relative to a body for pushing an oil.
Figure 4:
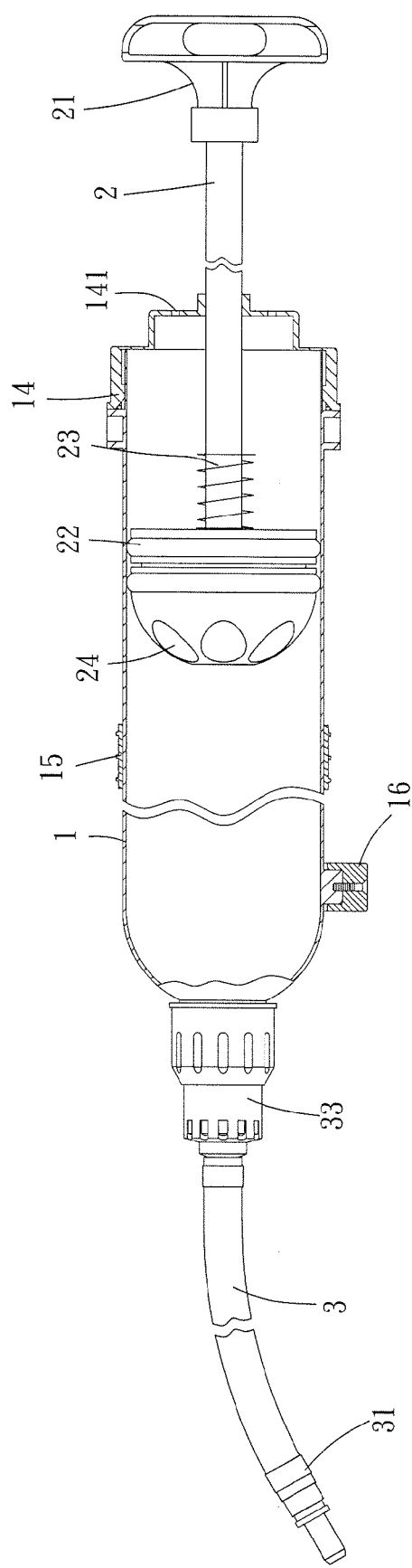

Referring to FIGS. 3-4, when the user wants to supply oil into the oil tank or to exhaust the oil from the oil tank of a vehicle (said supplement is an example of the embodiment), the user could supply the oil into the body 1 via the opening 12, so that the oil is located between one end of the piston member 2 and the flowing hole 11; thereafter, the user operates the handle 21 to drive the piston member 2 to move relative to the body 1, so as to have the oil flow into the tube member 3 via the flowing hole 11 and the valve member 32. Moreover, the positioning member 31 of one end of the tube member 3 could be positioned at the opening of the oil tank, so that the oil can flow from the tube member 3 of the body 1 into the oil tank.

Thus, the user could observe the transparent body 1 and the indicator 13 for actually realizing a residual amount of the oil in the storing space of the body 1; thereby the user could decide a proper amount of the oil in the body 1 before said supplement, or the user could remove the body 1 from the oil tank after all the oil is supplied into the oil tank. Thus, the oil would not be dripped out form the body 1 for avoiding a waste of the oil and a pollution of an environment.

Moreover, the user could adjust a flow area between the valve member 32 and the tube member 3 via the controlling member 33, so as to adjust a flow rate and a flow velocity of the oil which flows into the oil tank. Furthermore, the groove 24 which is formed at a front end of the piston member 2 could effectively reduce a weight and a producing material of the piston member 2.

Under above arrangement, the present invention actually provides a convenient function for observing the residual amount of the oil in the body 1, and is also conveniently operated to supply the oil into the body 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An oil injector for a vehicle comprising:
a body being transparent and having a flowing hole formed at a front end thereof, a flexible tube member connected to the body and corresponding to the flowing hole, a storing space formed in an internal portion of the body; and
one end of a piston member entered into the storing space, the piston member being movable relative to the body;
wherein, the piston member provides a pushing function in the storing space so that a fluid flows into or out from the body via the tube member, and the transparent body is provided for observing a storing amount of the fluid in the body;
wherein the front end of the body is integrally protrudingly tapered and formed with a threaded portion around the flowing hole, a valve member is threaded to the threaded portion, a controlling member is disposed around the valve member;
wherein the controlling member includes an outer tubular member disposed around the valve member and an inner tubular member sleeved between the outer tubular member and the valve member, and the inner tubular member integrally taperedly projects out of the outer tubular member to form a necked tube portion for the flexible tube member to be sleeved thereon;
wherein the inner tubular member is helically movable between a first position and a second position relative to the outer tubular member and the valve member for controlling a flowing amount between the valve member and the tube member; a rib portion and at least one through hole are disposed at a front end of the valve member; when the inner tubular member is located at the first position, the rib portion does not abut against an internal wall of the inner tubular member, so that the flowing hole communicates with the through hole and the tube member; when the inner tubular member is located at the second position, the valve member abuts against the internal wall of the inner tubular member, so that the through hole does not communicate with the tube member.

2. The oil injector for a vehicle as claimed in claim 1, wherein an indicator is disposed on the body for observing the storing amount of the fluid in the internal portion of the body.

3. The oil injector for a vehicle as claimed in claim 1, wherein at least one groove is formed at a front end of the piston member for reducing a weight and a producing material of the piston member.

4. The oil injector for a vehicle as claimed in claim 1, wherein an external circumference of the body is sleeved by an anti-skid member for being conveniently held.

5. The oil injector for a vehicle as claimed in claim 1, wherein one end of the body has an opening communicating with the storing space; a cover is assembled to the body for sealing the opening; the fluid is allowed to flow into the storing space via the opening.

6. The oil injector for a vehicle as claimed in claim 1, wherein an external circumference of the piston member is sleeved by a pressing member which abuts against an internal wall of the storing space; a cover which is assembled to the body has at least one air hole disposed between the pressing member and one end of the body for adjusting an air pressure in the storing space, so that the piston member is movable relative to the body.

7. The oil injector for a vehicle as claimed in claim 6, wherein an external side of the pressing member is formed as cone-shaped for reducing a friction between the pressing member and the internal wall of the storing space and increasing a sealing efficiency.

8. The oil injector for a vehicle as claimed in claim 1, wherein one end of the body has an opening communicating with the storing space; a cover is assembled to the body for sealing the opening; at least one air hole is disposed on the cover for adjusting an air pressure in the storing space, so that the piston member is movable relative to the body.

9. The oil injector for a vehicle as claimed in claim 1, wherein a frame is assembled on an external circumference of the body for supporting the body.

10. The oil injector for a vehicle as claimed in claim 1, wherein a metallic positioning member is assembled at one end of the tube member.

11. The oil injector for a vehicle as claimed in claim 1, wherein the piston member is formed as a hemisphere to have the piston member smoothly abut against an internal wall of the storing space.

12. The oil injector for a vehicle as claimed in claim 1, wherein the valve member includes a conical shell member open toward a direction opposite the threaded portion and a conical surface facing the threaded portion and tapered toward a center of the threaded portion, and the conical shell member selectively sealingly abuts against an internal wall of the controlling member.

13. The oil injector for a vehicle as claimed in claim 12, wherein the conical shell member includes a ring skirt section extending and tapered in the direction opposite the flowing hole, and the ring skirt section selectively sealingly abuts against the internal wall of the controlling member.

14. The oil injector for a vehicle as claimed in claim 1, wherein the inner tubular member is disposed around the valve member and axially movable relative to the valve member, the valve member includes a circumferential slop, and through axial movement of the inner tubular member relative to the valve member, the circumferential slop selectively moves entirely into the inner tubular member or move away from the inner tubular member.

* * * * *